(12) United States Patent
Deharde et al.

(10) Patent No.: US 7,896,402 B2
(45) Date of Patent: Mar. 1, 2011

(54) SPACER FOR COAXIALLY SHEATHED FUEL PIPES

(75) Inventors: Joachim Deharde, Lentfoehrden (DE); Ralf Becks, Hamburg (DE)

(73) Assignee: Airbus Deutschland GmbH (DE)

( * ) Notice: Subject to any disclaimer, the term of this patent is extended or adjusted under 35 U.S.C. 154(b) by 0 days.

(21) Appl. No.: 11/588,993

(22) Filed: Oct. 27, 2006

(65) Prior Publication Data

US 2007/0200031 A1 Aug. 30, 2007

Related U.S. Application Data

(63) Continuation of application No. PCT/EP2005/004579, filed on Apr. 28, 2005.

(60) Provisional application No. 60/598,263, filed on Aug. 3, 2004.

(30) Foreign Application Priority Data

Apr. 30, 2004 (DE) .......................... 10 2004 021 245

(51) Int. Cl.
*F16L 7/00* (2006.01)
(52) U.S. Cl. .................. 285/123.1; 138/108; 244/135 R
(58) Field of Classification Search .................... 285/19, 285/22, 419, 123.1, 123.3, 123.15; 244/135 R, 244/129.1; 138/112, 111, 113, 114, 108
See application file for complete search history.

(56) References Cited

U.S. PATENT DOCUMENTS

| 360,782 | A | * | 4/1887 | Ober ............................. 138/113 |
| 2,551,867 | A | * | 5/1951 | Bond ............................. 138/113 |
| 2,693,223 | A | * | 11/1954 | Krupp ............................. 156/144 |
| 3,343,250 | A | * | 9/1967 | Goforth et. al. .................. 29/423 |
| 4,165,111 | A | | 8/1979 | Zanichelli |
| 4,182,378 | A | * | 1/1980 | Dieter ........................... 138/112 |
| 4,225,833 | A | * | 9/1980 | Comte ......................... 333/28 R |
| 4,896,701 | A | * | 1/1990 | Young ........................... 138/108 |
| 5,441,082 | A | * | 8/1995 | Eskew et al. .................. 138/112 |
| 5,592,975 | A | * | 1/1997 | Wissmann et al. ........... 138/112 |
| 5,803,127 | A | * | 9/1998 | Rains ............................ 138/113 |
| 6,003,559 | A | * | 12/1999 | Baker ........................... 138/108 |
| 6,158,475 | A | * | 12/2000 | Clemmer ...................... 138/112 |
| 6,199,595 | B1 | * | 3/2001 | Baker ........................... 138/149 |
| 6,527,013 | B2 | * | 3/2003 | Somerville et al. ........... 138/148 |
| 6,571,832 | B1 | * | 6/2003 | Elliott .......................... 138/108 |
| 6,896,004 | B1 | * | 5/2005 | Witzel .......................... 138/112 |
| 7,156,126 | B2 | * | 1/2007 | Topek et al. .................. 138/117 |
| 7,225,837 | B1 | * | 6/2007 | Kane ............................. 138/112 |
| 2002/0093195 | A1 | * | 7/2002 | Poehler ....................... 285/123.1 |
| 2003/0201025 | A1 | * | 10/2003 | Calais et al. .................. 138/112 |

FOREIGN PATENT DOCUMENTS

| DE | 2 048 424 | 4/1972 |
| DE | 76 11 150 | 8/1976 |
| DE | 26 47 235 | 4/1978 |
| DE | 202 17 245 | 1/2003 |
| EP | 0 274 235 | 7/1988 |
| EP | 0 784 179 | 7/1997 |
| EP | 1 431 642 | 6/2004 |
| EP | 1 477 716 | 11/2004 |

* cited by examiner

*Primary Examiner* — Benjamin P Lee
(74) *Attorney, Agent, or Firm* — Lerner, David, Littenberg, Krumholz & Mentlik, LLP

(57) ABSTRACT

The present invention relates to spacers and pipelines. The spacers are mounted between two pipes—an internal line and an external line—and hold them at a defined distance. A closure is necessary for fixing the spacer on the pipes. Space, weight, and mounting time may advantageously be saved by integrating the closure into the spacer.

18 Claims, 4 Drawing Sheets

SPACER FOR COAXIALLY SHEATHED FUEL PIPES

CROSS-REFERENCE TO RELATED APPLICATIONS

This application is a continuation of International Application No. PCT/EP2005/004579, filed Apr. 28, 2005 and published as WO 2005/106306, which international application claims the benefit of the filing date of German Patent Application No. 10 2004 021 245.7, filed Apr. 30, 2004 and of U.S. Provisional Patent Application No. 60/598,263 filed Aug. 3, 2004, all of the disclosures of which applications is hereby incorporated herein by reference.

BACKGROUND OF THE INVENTION

The present invention relates to a spacer, particularly for coaxially sheathed fuel pipes of an aircraft. The intermediate space obtained via the spacer is used for ventilation and drainage of leakage liquid and condensed water, particularly for fuel pipes in aircrafts, in which such coaxially sheathed fuel pipes are required and/or prescribed in the fuselage region.

Coaxially sheathed fuel lines comprise an internal line and an external line, which encloses the internal line. In order to ensure a uniform distance between internal and external pipes under all circumstances, spacers are necessary between the internal and external pipelines. Internal and external lines may be manufactured from identical or different materials. These may be pipe, hose, or cable systems.

A spacer is known, i.e., from German Patent DE 26 47 235 C2. The spacer disclosed herein consists of several ring segments which are which are closed with individual tensioning wedges.

EP 1 431 642 A1 discloses a spacer in order to position an inner pipe in an outer pipe.

Furthermore, DE 2 048 424 discloses a fuel line with a spacer. The spacer has gliding cams and is closed by using separate clamping devices such as, i.e., a rivet or a screw.

Further, known from U.S. Pat. No. 5,441,082 A is a spacer which is held together by using additionally attached flanges.

EP 0 784 179 discloses a spacer for media tubes which are lead through tubular cable protection.

Currently, plastic spacers are disadvantageously used, which are fixed in a slip-proof way on the internal pipe using complex screw fasteners. This type of mounting may only be performed in a cumbersome way. The danger exists that damage to the internal pipe will occur because of the high pretension force of the screw. The internal pipe may, for example, be dented by the high force. During the mounting, one must work with special care in order to avoid contact of the screw fastener with the external pipe. If contact with the screw occurs, the external pipe may be damaged. In addition, multiple components (main body, screw, washer, nut) must be assembled during mounting, which is disadvantageous. Therefore, the greatest care is required during mounting, because of which mounting becomes complex.

New requirements for implementing special pipe diameters and especially small spaces between internal and external pipe lines may not be implemented using screw fasteners because of the space required.

SUMMARY OF THE INVENTION

It is an object of the present invention to specify an improved spacer.

According to an exemplary embodiment of the present invention, as mentioned in claim 1, a spacer for pipes is specified. The spacer comprises a closure, a pipe clamping structure, and at least one distance element. This at least one distance element is attached to the pipe clamping structure. The at least one closure is integrated into at least one of the pipe clamping structure and the at least one distance element. At least one of the closures is adapted to be adjustable in a way that allows the adjustment of the diameter of the spacer.

This exemplary embodiment of the present invention advantageously allows the integration of the closure into the spacer. In this way, a loss of closure elements during mounting may be suppressed. Errors during assembly may also be avoided. If necessary, the mounting may even be performed by untrained personnel.

In contrast to known plastic spacers described above, errors may be avoided during mounting and time may be saved during assembly. The components necessary for the mounting are mounted on the part itself and present on location. Therefore, it is no longer possible to lose elements important for mounting without destroying the part.

According to a further exemplary embodiment of the present invention, the at least one distance element and a pipe form a unit. The at least one distance element holds the pipe at a defined distance in relation to a receiver, for example, an outer pipe. Through this arrangement, a permanently determined distance between the pipe and the receiver may be produced, so that pipe and receiver do not touch.

According to a further advantageous exemplary embodiment of the present invention, the arrangement of the at least one distance element and a first pipe may be designed in such a way that it is held centered in a second pipe. Through the sheathing of the first pipe by the second pipe, ventilation of the first pipe is possible. Leakage liquid and condensed water may be transported away easily. The centering mounting fixes the first pipe in the second pipe, so that a spacing is produced on all sides. Striking of the first pipe on the second pipe may be prevented by the centering mounting.

According to a further advantageous exemplary embodiment of the present invention, the closure may comprise at least one pin and at least one eye. The at least one eye receives the at least one pin. The mounting is thus made easier and the manufacturing of the pipelines, in which multiple spacers are attached to the internal pipe and inserted into the external pipe, is accelerated.

According to a further exemplary embodiment of the present invention, the pin comprises at least one first hook and the eye comprises at least one second hook. The parts in which the pin is inserted into the eye determines a gap between the components of the spacer. This gap is initially changeable; however, after the hooks have locked together, it may only be reduced without a special tool. The hooks produce a self-locking effect. The width of the gap determines the diameter of the pipe clamping structure. This set diameter influences the pressure which the spacer exerts on the first pipe and is adjustable via the position of the locked hooks.

According to a further aspect of the present invention, the pin and the eye may be implemented like a cable tie. Typical cable tie tools may then be used for the mounting. These tools allow a defined tensile force and/or a defined gap dimension to be set. High quality is thus possible with rapid mounting speed. The danger of denting and damaging the first pipe in the event of strikes in accordance with the known plastic spacer described above, which is usually implemented using screws, may be countered using this exemplary embodiment.

According to a further advantageous exemplary embodiment of the present invention, a further closure may be designed as a snap-fit closure in the case that two or more closures exist. The closure is produced from two structures which fit one inside the other. The first structure has first dimensions, which are enclosed by second smaller dimensions, produced by at least one jaw, in such a way that unintentional sliding out is no longer possible. In order to allow the first dimensions to slide into the second smaller dimensions, the at least one jaw is designed as flexible in order to permit a sufficiently large opening temporarily.

According to a further exemplary embodiment of the present invention, the pipe clamping structure may be provided with a joint. This exemplary embodiment may make it easier to attach the spacer. If the pipe clamping structure must be implemented as rigid in order to achieve the required stability, lateral placement of the spacer on the first internal pipe may not be possible. A spacer provided with a joint makes attachment at the desired location easier. In case of use with multiple permanently mounted spacers in particular, this may be advantageous in order to allow the replacement of individual spacers without dismounting the others, for example.

According to a further advantageous exemplary embodiment of the present invention, the spacer may be manufactured from one part. In addition to advantages during manufacturing of the spacer, which may be performed in this case without final assembly, provision as a single part offers the advantage that no components of the spacer may be lost. All elements which are necessary for mounting are provided on the part. In addition, no additional components are necessary during installation, which may place restrictions on the installation space. Additional fastener material would require additional space. Therefore, smaller distances may also be produced between the internal and external pipes.

According to a further exemplary embodiment of the present invention, it may be advantageous to manufacture the spacer from plastic (e.g., polyamide). The plastic must fulfill the special requirements in regard to pressure resistance and acid resistance. In this exemplary embodiment, plastic may offer the advantage that a high stability is achieved at low weight. If the spacer is implemented from plastic, the weight is reduced in relation to the known spacers, in which screws are used for attachment.

According to a further exemplary embodiment of the present invention, the spacer is manufactured in the injection molding method.

According to a further exemplary embodiment of the present invention, the spacer is adapted for coaxially sheathed fuel lines.

According to a further exemplary embodiment of the present invention, the spacer is implemented for one of a rigid line or a flexible line, a hose and a cable. The spacer may advantageously be used in line systems comprising any arbitrary combination of lines, such as hose in a pipe, pipe in a hose, or hose in a hose.

A further exemplary embodiment of the present invention relates to an aircraft comprising a spacer as described in one of the above embodiments.

BRIEF DESCRIPTION OF THE DRAWINGS

In the following, exemplary embodiments of the present invention will be described in greater detail with reference to the following figures.

DETAILED DESCRIPTION

In the following descriptions of FIG. 1 through FIG. 6, identical reference numbers are used for identical or corresponding elements.

Figure 1:
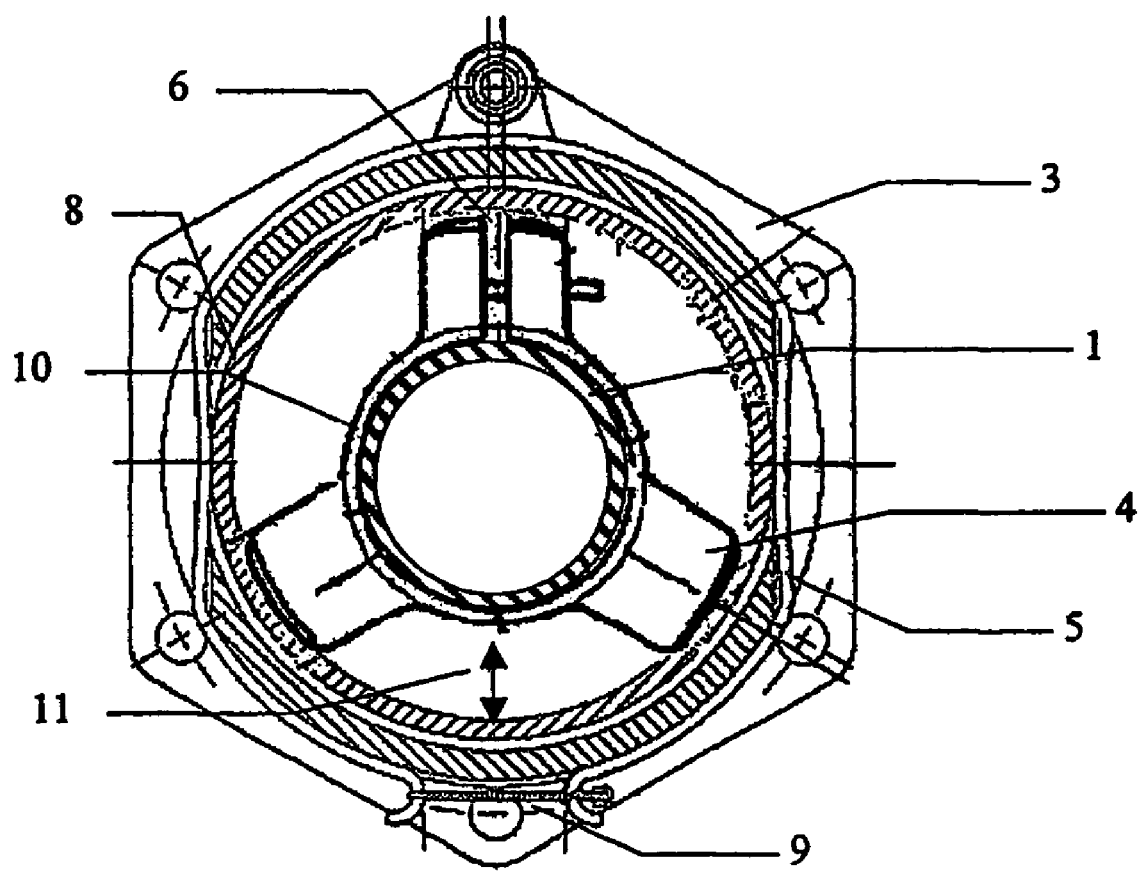
FIG. 1 shows an exemplary embodiment of a spacer according to the present invention installed between an internal pipe and an external pipe.

FIG. 1 shows an exemplary embodiment of a spacer according to the present invention in its use between an internal pipe and an external pipe of a pipeline system. In this case, a pipeline system is understood as any combination of a rigid or flexible line, particularly a hose or a cable. Thus, line systems such as pipe in pipe, hose in pipe, pipe in hose, or hose in hose may be implemented.

A flange 3 is provided in order to be able to connect multiple line systems to one another. A spring 5, which is held together by a rubber band 9, for example, prevents the line structure from slipping out of the fastener structure. An internal pipeline 1 is enclosed by a pipe clamping structure 10 having distance elements 4 in such a way that a pressure is built up on the internal pipe 1 and therefore a slip-proof connection is produced. Using the closure according to the present invention, the width of the gap 6, which is implemented in one of the at least one distance element 4 or the pipe clamping structure 10, is influenced. This width regulation has an effect on the diameter of the pipe clamping structure 10 and therefore on the pressure on the internal pipe 1.

The distance elements 4 abut the internal wall of the external pipe 8 and thus hold the internal pipe at a specified distance to the external pipe. This resulting intermediate space 11 is used for ventilation and drainage of leakage liquid and condensed water and is required and/or prescribed according to FAA/JAA guidelines for the fuel system in the fuselage region of aircrafts. The exemplary embodiment of the present invention advantageously allows a smaller intermediate space 11 to be implemented between internal and external pipes than would be possible using a screw fastener.

Figure 2:
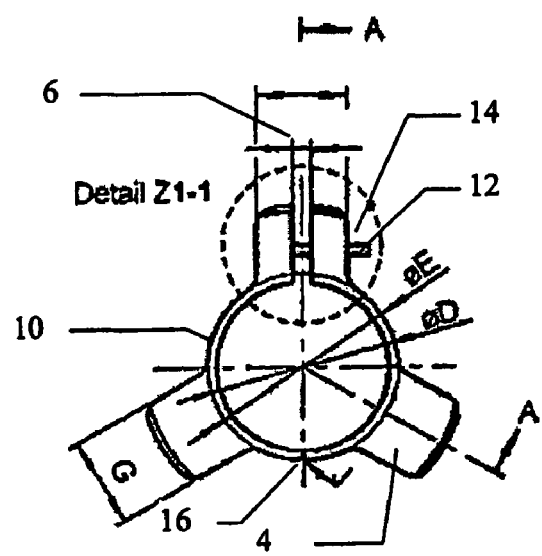
FIG. 2 shows a frontal view of an exemplary embodiment of a spacer according to the present invention.

FIG. 2 shows a view of the spacer according to an advantageous exemplary embodiment of the present invention. A width of the gap 6, which regulates the pressure on the internal pipe, it is not regulated using a screw fastener, but rather using a pin 12, which penetrates into the eye 14 to the depth corresponding to the necessary pressure.

The pipe clamping structure 10, the distance elements 4, the pin 12, and the eye 14 may be manufactured in one piece with the spacer. This avoids multiple elements being necessary during mounting to produce the connection. Through the integration of the closure, comprising a pin 12 and an eye 14, into the distance element 4, for example, less space is necessary for installation in the external pipe. Therefore, smaller pipe distances 11 may also be achieved than would be possible using the known plastic spacers having screws.

An exemplary embodiment of a joint 16 is also shown in FIG. 2. This joint may be necessary if the spacer is manufactured from one piece and is to be put onto the pipe. However, it is also used for keeping the gap 6 movable.

The number of the distance elements may be arbitrary. The width and depth of the distance elements may also be designed arbitrarily. In the arrangement shown in FIG. 2, they center the internal pipe. However, a non-centering arrangement is also conceivable.

Figure 3:
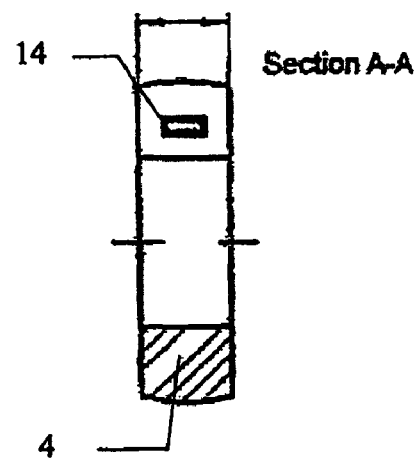
FIG. 3 shows a sectional view of an exemplary embodiment of a spacer according to the present invention along the section A-A in FIG. 2.

FIG. 3 shows a sectional view through an exemplary embodiment of the present invention along the section A-A in FIG. 2. The eye 14, into which the pin 12 is inserted, a section through the distance element 4, and a part of the pipe clamping structure 10 are shown. The width of the spacer is to be selected in accordance with the particular requirements.

Figure 4:
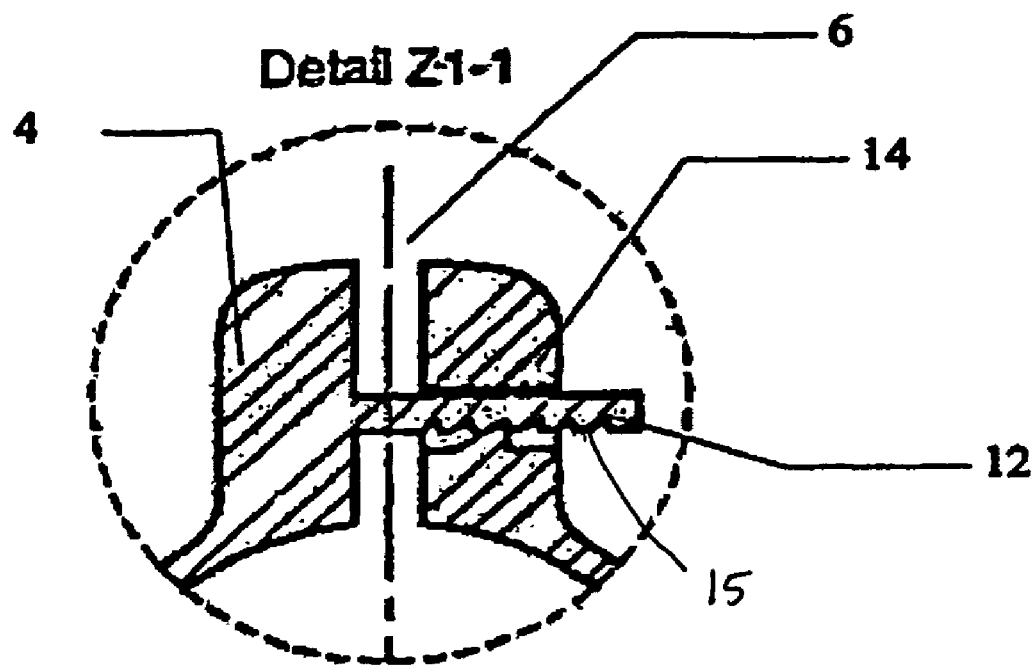
FIG. 4 shows a more detailed view of an exemplary embodiment of a closure for a spacer according to the present invention.

An advantageous exemplary embodiment of the closure of the present invention is shown in FIG. 4. Through the force with which the two halves of the distance element 4 are pressed together, the pressure of the pipe clamping structure 10 on the internal pipe is set in the way described above. The at least one pin and the at least one eye are inserted one into the other. At least one hook is attached to the at least one pin and in the at least one eye, which are flexible enough in order to allow them to slide over one another in one direction. Sliding back is blocked, corresponding to the function of a barb. The mutually attached hooks 15 in the eye 14 and on the pin 12 form a permanent connection, in that they mutually block one another. If the closure has the form of a known cable tie, the tensile force and/or gap width may be predefined using known auxiliary tools for cable ties and the pressure on the internal line may thus be regulated. As a result, the danger of damage through too high a pressure on the internal pipe is minimized. If the entire spacer and particularly the closure are manufactured from plastic, the danger of damage to the external pipe due to contact is minimized. No metal, such as from a screw, then contacts the external pipe.

Figure 5:
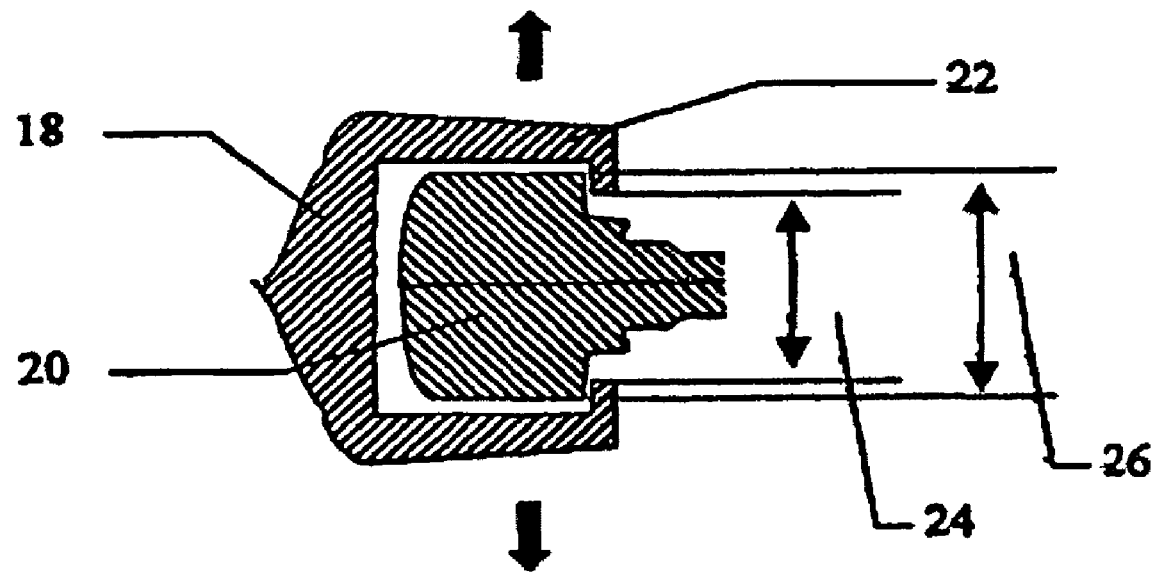
FIG. 5 shows a sketch of an exemplary embodiment of a closure according to the "snap-fit" principle.

FIG. 5 shows a further advantageous exemplary embodiment of the closure for the spacer according to the present invention. Two structures which fit one inside the other form a snap-fit closure. Both structures have different dimensions. The first structure 20 has first dimensions 26 which are enclosed by smaller second dimensions 24, formed by at least one jaw 22, in such a way that unintentional sliding out is no longer possible. In order to allow the first dimensions 26 to slide into the second smaller dimensions, the at least one jaw 22 is designed as flexible in order to permit a sufficiently large gap opening temporarily.

Figure 6:
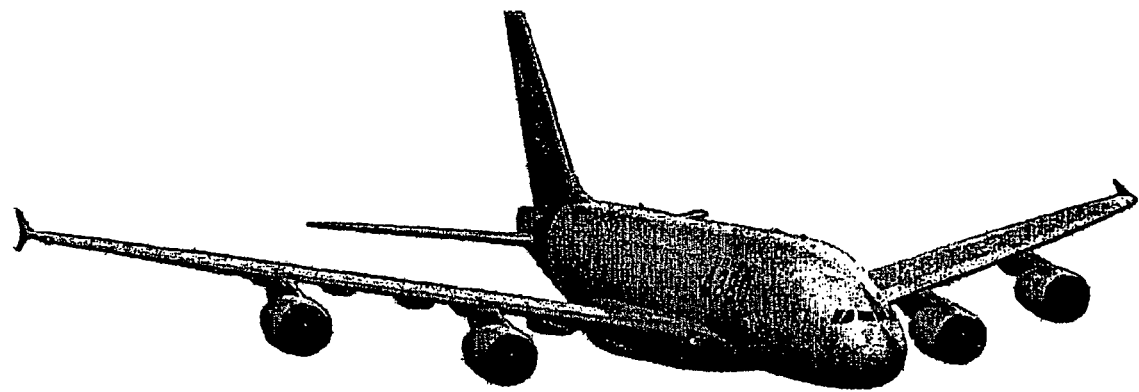
FIG. 6 shows an aircraft comprising an exemplary embodiment of the spacer according to the present invention.

FIG. 6 shows an aircraft, particularly a commercial aircraft which may comprises a spacer according to the present invention.

The invention claimed is:

1. A spacer for spacing an internal aircraft pipe from an external aircraft pipe, wherein the spacer comprises:
   at least one closure;
   a pipe clamping structure having a diameter;
   at least one distance element,
   wherein the pipe clamping structure is adapted to enclose the internal pipe;
   wherein the at least one distance element is attached to the pipe clamping structure and
   wherein the at least one distance element is adapted to abut an internal wall of the external aircraft pipe and for holding the internal aircraft pipe at a specified distance to the external aircraft pipe;
   wherein the at least one closure is integrated into the at least one distance element such that the at least one distance element comprises two sections facing each other and forming a gap between the components of the spacer;
   wherein the gap has a width;
   wherein at least one distance element is adapted such that by pressing the two sections of the distance element together the width of the gap is changed and the diameter of the pipe clamping structure is determined;
   wherein one of the two sections of the distance element comprises a pin and the other of the two sections of the distance element comprises an eye;
   wherein the pin is provided with at least one first hook and the eye is provided with at least one second hook;
   wherein the pin enters the eye such that the at least one first and second hooks hook together to close the closure, the pin being of sufficient length to extend through said eye beyond said distance element;
   wherein the first hook and the second hook are flexible in order to allow them to slide over one another;
   wherein the depth up to which the pin penetrates the eye is adjustable for adapting the diameter of the clamping structure of the spacer;
   wherein the entire spacer is configured as a single part such that elements which are necessary for mounting are provided on the single part avoiding adding of additional components during the installation.

2. The spacer of claim 1, wherein the outline of the at least one distance element corresponds to the outline of another distance element.

3. The spacer of claim 2, wherein the internal pipe is held centered in the external pipe.

4. The spacer of claim 1, wherein the two sections of the at least one distance element are approximately equal in size.

5. The spacer of claim 1, wherein when there are two or more closures,
   the second closure element is adapted to provide for a first motion of the first closure element in a first direction when the first and second closure elements are engaged;
   wherein the second closure element is adapted to obstruct a second motion opposite to the first direction when it is engaged with the first closure element.

6. The spacer of claim 1, wherein the pipe clamping structure is provided with a joint to make opening easier.

7. The spacer of claim 1, wherein the spacer is made of plastic.

8. The spacer of claim 1, wherein the spacer is manufactured in the injection molding method.

9. The spacer of claim 1, wherein the spacer is adapted for coaxially sheathed fuel pipes of an aircraft.

10. The spacer of claim 1, wherein the internal pipe is one of a rigid line, a flexible line, a hose, and a cable.

11. The spacer of claim 1, wherein said at least one first hook is more than one hook.

12. The spacer of claim 1, wherein said at least one second hook is more than one hook.

13. The spacer of claim 1, wherein the pin and the eye are implemented as a cable tie.

14. The spacer of claim 1, wherein the eye is adapted to allow the pin to be inserted into the eye substantially only in a direction parallel to the width of the gap.

15. The spacer of claim 1, wherein the clamping structure is implemented as a substantially rigid structure.

16. The spacer of claim 1, wherein the spacer is adapted to allow for reducing the gap without a special tool.

17. The spacer of claim 1, wherein the outline of the first section matches the outline of the second section.

18. An aircraft, comprising a spacer for spacing an internal aircraft pipe from an external aircraft pipe within the aircraft, the spacer having at least one closure, a pipe clamping structure having a diameter, and at least one distance element,
   wherein the pipe clamping structure is adapted to enclose the internal pipe, wherein the distance element is attached to the pipe clamping structure and wherein the at least one distance element is adapted to abut an internal wall of the external aircraft pipe and for holding the internal aircraft pipe at a specified distance to the external aircraft pipe wherein the at least one closure is integrated into the at least one distance element such that the at least one distance element comprises two sections facing each other and forming a gap between the components of the spacer;

wherein the gap has a width;

wherein at least one distance element is adapted such that by pressing the two sections of the distance element together the width of the gap is changed and the diameter of the pipe clamping structure is determined;

wherein one of the two sections of the distance element comprises a pin and the other of the two sections of the distance element comprises an eye;

wherein the pin is provided with at least one first hook and wherein the eye is provided with at least one second hook;

wherein the pin enters the eye such that the at least one first and second hooks hook together to close the closure, the pin being of sufficient length to extend through said eye beyond said distance element;

wherein the first hook and the second hook are flexible in order to allow them to slide over one another;

wherein the depth up to which the pin penetrates the eye is adjustable for adapting the diameter of the clamping structure of the spacer;

wherein the entire spacer is configured as a single part such that elements which are necessary for mounting are provided on the single part avoiding adding of additional components during the installation.

* * * * *